United States Patent
Garfunkel et al.

[11] Patent Number: 6,111,406
[45] Date of Patent: Aug. 29, 2000

[54] SYSTEM AND METHOD FOR TESTING A WRITE HEAD IN A COMBINED MAGNETIC HEAD USING AN ASSOCIATED READ SENSOR IN THE COMBINED HEAD

[75] Inventors: Glen Adam Garfunkel, Palo Alto; Donald E. Horne; Michael Salo, both of San Jose, all of Calif.

[73] Assignee: International Business Machines Corporation, Armonk, N.Y.

[21] Appl. No.: 08/920,033

[22] Filed: Aug. 28, 1997

[51] Int. Cl.[7] .......................... G01R 33/12; G11B 5/455; G11B 5/39
[52] U.S. Cl. ............................... 324/210; 369/53
[58] Field of Search .................... 324/210–212; 360/113, 31, 48, 53, 54; 369/53

[56] References Cited

U.S. PATENT DOCUMENTS 5,479,098  12/1995  Yakoyama et al. ...................... 324/212
5,721,488   2/1998  Sakai et al. ............................. 324/210

FOREIGN PATENT DOCUMENTS 54-18716  2/1979  Japan .

OTHER PUBLICATIONS

G.A. Gibson, S. Schultz, T. Carr & T. Jagielinksi, "Spatial Mapping Of The Sensitivity Function Of Magnetic Recording Heads Using A Magnetic Force Microscope As A Local Flux Applicator", IEEE Transactions On Magnetics, vol. 28, No. 5, Sep. 1992.

*Primary Examiner*—Walter E. Snow
*Attorney, Agent, or Firm*—Gary Cary Ware & Freidenrich LLP; Ervin F. Johnston

[57] ABSTRACT

A method for assessing write element performance in a combined magnetic head that also includes a magnetoresistive (MR) read element for a data storage drive includes exciting the write element with a square wave immediately after lapping the head during manufacture, before mounting the head for operation in the drive. The write element generates an output signal, and the output signal is detected by the read element and then used to determine whether the write element is defective. By using a square wave, temperature gradients in the head and inductive pick up is avoided, thereby facilitating the use of the read element as a test sensor.

23 Claims, 2 Drawing Sheets

SYSTEM AND METHOD FOR TESTING A WRITE HEAD IN A COMBINED MAGNETIC HEAD USING AN ASSOCIATED READ SENSOR IN THE COMBINED HEAD

BACKGROUND OF THE INVENTION

1. Field of the Invention

The present invention relates generally to components for data storage drives, and more particularly to systems and methods for quality assurance testing of write heads that are installed in such drives.

2. Description of the Related Art

Electronic data storage devices include computer disk drives and tape drives. Several types of hard disk drives are known, most notably hard disk drives that incorporate one or more storage disks coated with a material whose magnetic characteristics can be altered to represent binary data. To alter the magnetic characteristics of the material, a magnetic head is positioned in close proximity to a disk while the disk is rotated, with a write element of a head being activated as appropriate as a portion of a disk rotates past it to thereby alter atomic magnetic domains of the material. The magnetic fields generated by the atomic magnetic domains represent binary data.

To recover data from the disk, a read element of the head is positioned over the magnetized portion of the disk, and it senses the fields of the magnetic domains, producing a readback signal that represents the binary data stored on the disk. In many heads, the read element is not only close to the write element, but also uses one of the poles of the write element as a shield. Magnetics heads that use this principle are called "merged" or "combined" heads. These heads may have a stacked or a piggyback configuration.

To improve the performance and capacity of a hard disk drive, it is advantageous to position a head as close as possible to a surface of the disk. Further, to facilitate close placement of a head to a disk surface, the head preferably has an air bearing surface ("ABS"), i.e., a very smooth surface that faces the disk and is supported against it by a cushion of air, called an "air bearing", that is produced by rotation of the disk. Accordingly, lapping of the ABS is an important manufacturing step.

Similar considerations relate to the operation and performance of tape drives, where magnetic recording heads write information to a moving tape coated with magnetic material. Read heads may be merged with the write heads of tape drives in much the same way as in hard disk drives. Accordingly, the following is to be taken into account for any type of data storage that uses merged heads.

It is useful and cost efficient to assess the performance of a magnetic recording head as soon as possible in the manufacturing process. Rapid performance evaluation allows heads to be dispositioned early, avoiding costly further processing if the head is defective. Early performance evaluation gives more timely feedback to wafer and slider fabrication than if the finished devices are suspended and tested with a disk or a tape. It is an added advantage to be able to test the device independent of the disk or tape flying height (which add uncertainty to the measurements).

Existing test schemes that rely on measuring saturation current, or some other saturation parameter, to test the performance of a write element in a combined head measure only the effect of a combination of components. In the case of combined and merged heads, the performance of the write element itself, apart from the performance of the head as a whole, cannot easily be measured for all types of head geometries. Unfortunately, the inability to precisely measure the write performance of a combined or merged head before installation in a data storage drive package results in relatively late identification of device deficiencies and, concomitantly, relatively late identification of undesirable manufacturing process anomalies.

SUMMARY OF THE INVENTION

Fortunately, the present invention recognizes that it is desirable and possible to provide a system and method for early testing of write elements of combined heads that can be used with a large number of head geometries. Accordingly, it is an object of the present invention to provide a system and method for testing a write element of a magnetic head that combines the write element with an MR read element. Another object of the present invention is to provide a system and method for testing the write element of a combined head that does not require a test sensor apart from the head itself. Still another object of the present invention is to provide a system and method for testing the write element of a combined head that can be used to test the write element immediately after lapping. Yet another object of the present invention is to provide a system and method for testing the write element of a combined head that is easy to use and cost effective.

A method is disclosed for testing a write element of a combined head for a data storage drive. In this regard the term "combined head" refers to all head geometries that combine a write element with a magneto-resistive (MR) read element. Included are combined, merged, stacked, and piggyback heads, without limitation. The method includes applying a cyclic signal to the write element to cause the write element to generate a write field. Moreover, the method includes sensing the write field with the MR read element to generate a readback signal. Then, the readback signal is correlated to a desired performance of the write element.

In a preferred embodiment, the cyclic signal is a square wave, although in other embodiments it maybe sinusoidal. Preferably, the applying and sensing steps are accomplished prior to mounting the combined head in a data storage disk.

The preferred method also includes providing at least one reference head including an MR read element and a write element having known output signal properties. The write element of the reference head is energized to output a reference signal, and the reference signal is sensed by the MR read element of the reference head to generate a reference result. With this inventive concept, the correlating step is accomplished by comparing the readback signal to the reference result. A combined head that has been tested by the present method, as well as a data storage drive incorporating the head and a computer incorporating the data storage drive, are also disclosed.

In another aspect, a method for determining whether a write element of a magnetic recording head having an MR read element is defective includes, prior to mounting the head in a data storage drive, exciting the write element using a cyclic signal such that inductive signal pickup and temperature changes in the head are minimized. Additionally, the method includes sensing the output of the write element using the MR read element to generate a readback signal representative of whether the write element is defective.

In still another aspect, a method is disclosed for testing a write element of a combined magneto-resistive (MR) head having an MR read element. In accordance with the present invention, the write element is excited with an input signal to thereby cause the write element to generate a write field, such that the temperature of the write element is substantially constant. Then, the write field is sensed with the read element to thereby generate a readback signal. Next, it is determined whether the write element is defective, based on the readback signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

The invention to be described concerns the evaluation of write heads. The description is given with reference to a hard disk drive for the purpose of illustration. In fact magnetic heads tested using the means and procedure of the invention may be used in any appropriate data storage drive or device, without limitation.

Figure 1:
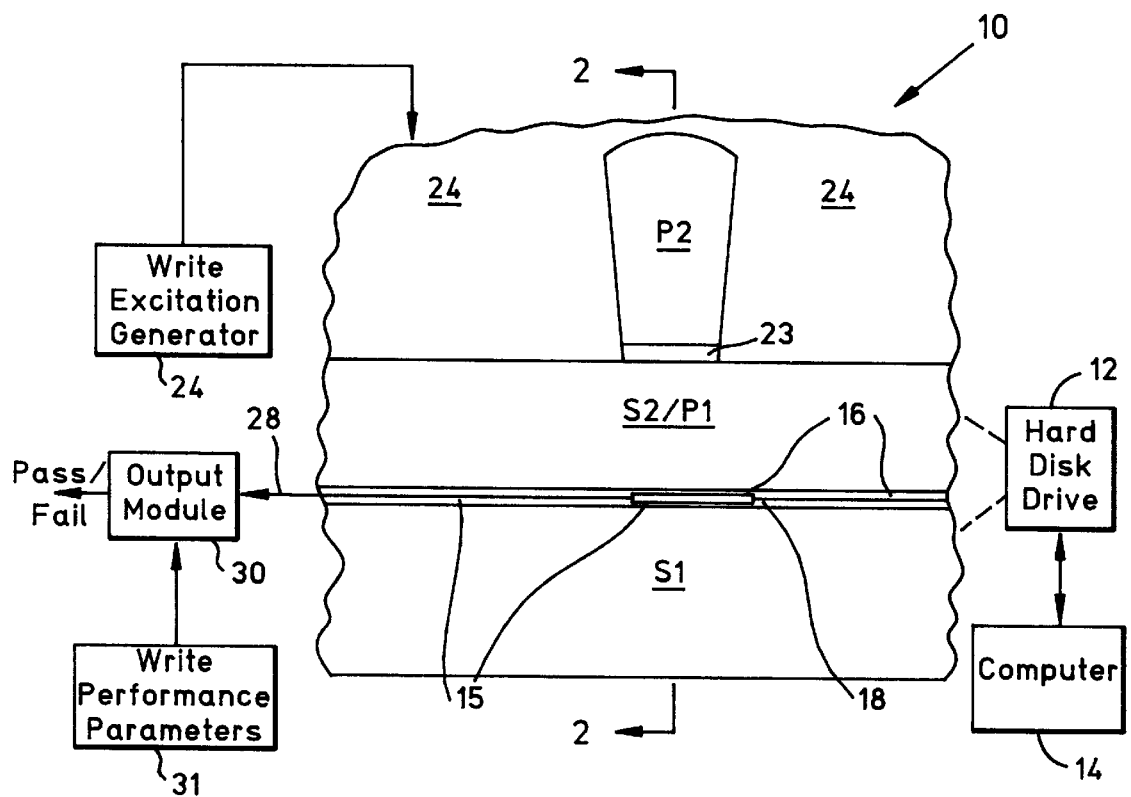
FIG. 1 is a plan view of the air bearing surface of a combined head that can be tested by the present method, schematically showing an associated hard drive, computer, excitation generator, and output module.
Figure 2:
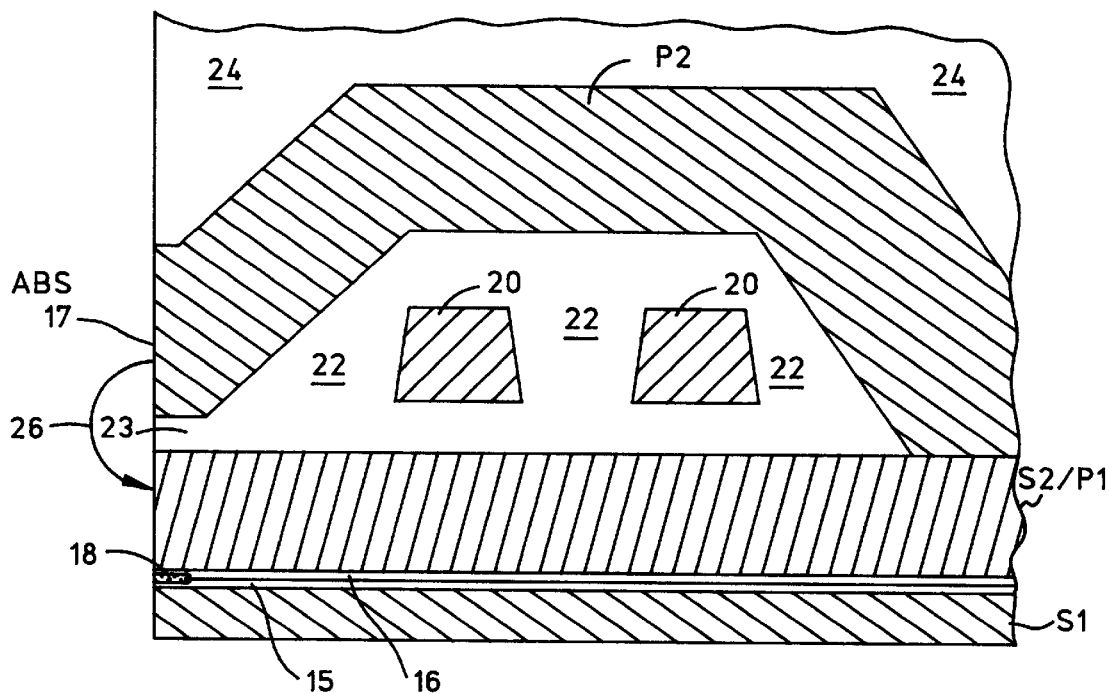
FIG. 2 is a cross-sectional view as seen along the line 2—2 in FIG. 1.

Referring initially to FIGS. 1 and 2, a magnetic head, generally designated 10, is shown that can be used in a hard disk drive 12 that in turn can be incorporated into a computer 14 in accordance with well-known principles. In one intended embodiment, the hard disk drive 12 is a hard disk drive made by International Business Machines Corporation (IBM) of Armonk, N.Y. Likewise, the computer 14 may be a personal computer made by IBM, or a computer sold under a trademark such as AS400, with accompanying IBM Network Stations. Or, the computer 14 may be a Unix computer, or OS/2 server, or Windows NT server, or IBM RS/6000 250, or an IBM laptop computer.

Preferably the magnetic head 10 is combined head that integrates a write element with a magneto-resistive read element. The magnetic head 10 is therefore able to read and write data on a magnetic disk, when mounted in a disk drive.

As disclosed herein, the purpose of the present invention is to test the write performance of the head 10. In understanding the present method, the relevant structural details of the head 10 will first be explained. With reference to FIGS. 1 and 2, the head 10 includes a read element including a first shield S1 that is closely spaced from a second shield/first pole S2/P1. The second shield/first pole S2/P1 functions as both a shield for the read element and a write element pole. The read element further includes insulation layers 15 and 16 disposed between the first shield S1 and second shield/first pole S2/P1, as shown, and an MR sensor 18 sandwiched between the insulation layers 15 and 16, at the air bearing surface (ABS) 17 of the head 10, as best shown in FIG. 2.

Closely juxtaposed to the second shield/first pole S2/P1, and opposite the first shield S1, is a write element that includes a coil layer 20, disposed in a region of coil insulation 22 that may comprise multiple layers of material. As best shown in FIG. 2, the write element includes a yoke-like second pole P2 surrounding that portion of the coil 20 that does not face the second shield/first pole S2/P1. The material that forms the coil insulation 22 fills a gap 23 that separates tips of the poles P1 and P2 at the ABS 17. As is conventional, the combined head 10 is formed integrally with a slider, a portion of whose structure is indicated generally by reference numeral 24.

With the above structure, in accordance with principles known in the art, the coil 20 can be connected to an excitation generator 25 (FIG. 1) to generate a magnetic field, a write portion of which fringes at 26 at the gap 23 in FIG. 2. The write portion 26 of the generated field affects magnetic domains on a disk that is incorporated in, e.g., the disk drive 12 shown in FIG. 1, to thereby perform the write function of the head 10.

We have noted that the MR sensor 18 of the MR read element, in the embodiment shown, is very close to the write portion 26 of the field generated by the write element of the head 10. Accordingly, we have discovered that the MR read element, given its proximity to the write portion 26 of the generated field, can be used to test the performance of the write element itself. In accordance with principles known in the art, the MR read element senses the write portion 26 and in response generates a readback signal that is conducted via one or more leads 28 to an output module 30 (FIG. 1).

Preferably the output module 30 includes a processing function that enables it to compare information in the readback signal that represents operation of the write element with write performance parameters stored (in ROM, for example) at 31. Based upon comparison or correlation of the readback output signal information with the stored write performance parameters, the module 30 produces an indication (PASS/FAIL) indicating whether the write element meets a reference operational threshold (PASS), or does not (FAIL).

Advantageously, a plurality of combined heads can be tested at the row level of manufacture, where a 1×N array of sliders formed in a monolithic block of material has been sliced from the block, and polished and lapped, but not separated into individual sliders. Each slider in the row has, formed at its trailing edge, one or more combined heads. Since all signal connections to the write and read elements of all heads are available at the row level, the heads of each slider in the row can be tested simultaneously.

Figure 3:
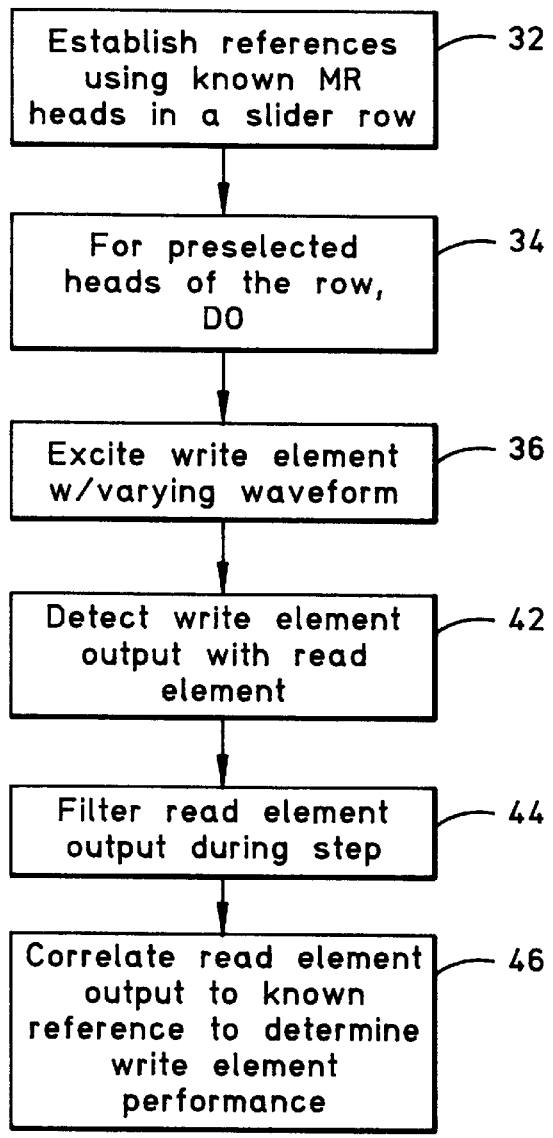
FIG. 3 is a flow chart of the present method.

Now referring to FIG. 3, the method steps of the present invention for row level, write element testing of one or more combined heads are illustrated. Commencing at step 32, a measurement reference is established. In one presently preferred embodiment, the reference is established by exciting write elements of reference heads in a slider row having known performances, both "good" and "bad", using the excitation waveforms described herein. The reference heads can be identical in configuration and operation to the head 10 shown in FIGS. 1 and 2, with the output signals from the MR read elements of these reference heads being recorded as references. Alternatively, the output signals from an MR read elements of a properly functioning combined head can be computationally determined. In either event, the result defines the write performance parameters stored, for example, at 31 in FIG. 1.

At step 34, the method enters a Do loop for preselected test heads, e.g., for each tenth head in a slider row, or indeed for each head in the row. For disclosure purposes, the steps below will be described in relation to the head 10 shown in FIGS. 1 and 2. It is to be understood that the process below preferably is undertaken immediately after the final lapping of the slider row that produces the ABS 17, prior to slicing the row and mounting the head 10 in disk drive 12. This promotes early testing of heads in the manufacturing process. Also, testing the heads before mounting them in a storage drive focusses the test on the write element itself, before it is combined with the remainder of a storage drive.

Figure 4:
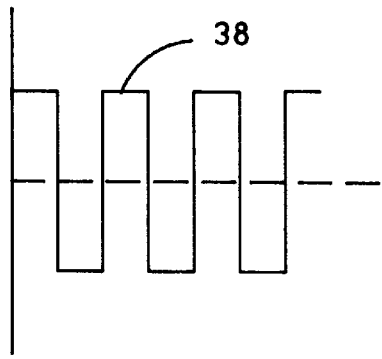
FIG. 4 is a graph showing the preferred square excitation signal.

Proceeding to step 36, the excitation generator 24 is activated to excite the write element and thereby induce the write portion 26 of the field. In accordance with the present invention, the write element is excited with a cyclic waveform. In one preferred embodiment, the write element is excited with an alternating square waveform 38 as shown in FIG. 4 having a frequency of approximately ten kiloHertz (10 kHz).

We have discovered that by exciting the write element with the square waveform 38, power in the head 10 remains relatively constant. Consequently, temperature in the head 10 does not change. This is desirable, because the MR read element can be more sensitive to temperature changes in the head 10 than to the write portion 26 of the flux lines generated by the write element. Additionally, exciting the write element using the square waveform 38 confines inductive pick up caused by changing current in the write element and sensed by the MR read element to the very short step period between adjacent positive and negative cycles of the square waveform 38. As described below, the output of the MR read element is filtered out during these step transients, so that only the portions of the readback signal that are used in write performance evaluation are those portions generated during periods of little or no inductive pick up.

Figure 5:
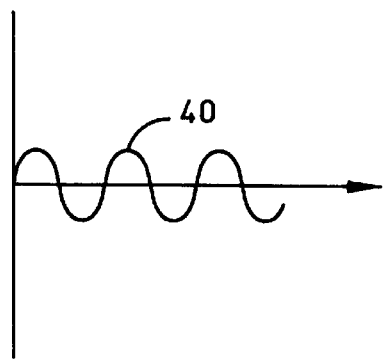
FIG. 5 is a graph showing a sinusoidal excitation signal.

As an alternative to the square waveform 38, a sinusoidal waveform 40 shown in FIG. 5 can be used. The sinusoidal waveform 40 has a frequency of about one megaHertz (1 mHz). When such a waveform is used, the inductive response of the combined head to excitation of the write element must be subtracted from the response of the MR sensor 18 to changes in bias current. This can be done either algorithmically, or by dithering the bias current of the MR sensor 18 at a frequency that is substantially higher than the frequency of the sinusoid and phase-locking the amplification of the readback signal to the dithering frequency.

Referring back to FIG. 3, at step 42 the write element output signal (i.e., the write portion 26 of the filed generated by the write element of the head 10) is detected by the MR read element. In response, the MR read element generates a readback signal, and sends the signal to the output module 30.

As mentioned above, at step 44 the output module 30 filters out of the readback signal those portions of the signal that are generated during step changes between adjacent cycles. Then, at step 46 the filtered readback signal is compared (correlated) to the known references generated at step 32 to determine write element performance, i.e., to determine whether the head 10 is defective.

In addition to the advantages of the present test method described above, the present method also provides an early indication of when the coil 20 has been incorrectly wired vis-a-vis the MR read element. More particularly, the polarity of the write current with respect to the direction of the bias current through the sensor 18 can be obtained from the phase of the readback signal produced by the MR read element. This information then can be used to determine whether the head 10 is correctly wired.

While the particular SYSTEM AND METHOD FOR TESTING A WRITE HEAD FOR A DATA STORAGE DRIVE USING AN ASSOCIATED READ SENSOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A method for testing a write element of a combined magnetic head, the head also having a read element, comprising:

applying a cyclic signal to the write element to cause the write element to generate a magnetic field;

sensing the magnetic field signal with the read element to generate a readback signal; and correlating the readback signal to a performance of the write element.

2. The method of claim 1, wherein the cyclic signal is a square wave.

3. The method of claim 2, wherein applying and sensing are performed at a row level of combined magnetic head fabrication.

4. The method of claim 3, wherein the read element includes a magneto-resistive (MR) sensor.

5. The method of claim 2, wherein the square wave is characterized by a frequency of about ten kiloHertz (10 kHz).

6. The method of claim 1, wherein the cyclic signal is a sinusoidal signal.

7. A method for evaluating performance of a write element of a magnetic head combining the write element with a read element, comprising:

prior to mounting the magnetic head for operation with a data storage device, exciting the write element with a varying signal, such that inductive signal pickup and temperature changes in the magnetic head are minimized;

sensing an output of the write element using the read element to generate a readback signal representative of write element operation;

providing at least one reference head including a write element with known output signal properties and a read element;

energizing the write element of the reference head to output a reference signal;

sensing the reference signal with the read element of the reference head to generate a reference result; and comparing said readback signal with the reference result.

8. The method of claim 7, wherein the cyclic signal is a square wave.

9. The method of claim 8, wherein the read element includes a magneto-resistive (MR) sensor.

10. The method of claim 9, wherein the square wave is characterized by a frequency of about ten kiloHertz (10 kHz).

11. The method of claim 9, wherein the cyclic signal is a sinusoidal signal.

12. A method for testing a write element of a magnetic head having a read sensor, comprising:

exciting the write element with an input signal to thereby cause the write element to generate an output signal, such that the temperature of the write element is substantially constant;

sensing the output signal with the read element to thereby generate a readback signal;

providing at least one reference head including a write element having known output signal properties and a read element;

energizing the write element of the reference head to output a reference signal;

sensing the reference signal with the read element of the reference head to generate a reference result; and comparing said readback signal with the reference result to determine whether the write element is defective.

13. The method of claim 12, wherein the input signal is a square wave.

14. The method of claim 13, wherein exciting and sensing are performed prior to mounting the magnetic head for operation with a data storage device.

15. The method of claim 13, wherein the square wave is characterized by a frequency of about ten kiloHertz (10 kHz).

16. The method of claim 12, wherein the input signal is a sinusoidal signal.

17. A method for testing a write element of a combined magnetic head, the head also having a read element with a magneto-resistive sensor, comprising:

applying a cyclic signal to the write element to cause the write element to generate a magnetic field;

sensing the magnetic field signal with the read element to generate a readback signal;

providing at least one reference head including a write element with known output signal properties and a read element;

energizing the write element of the reference head to output a reference signal;

sensing the reference signal with the read element of the reference head to generate a reference result; and comparing said readback signal with the reference result.

18. The method of claim 17, wherein the cyclic signal is a square wave.

19. The method of claim 18, wherein the square wave is characterized by a frequency of about ten kiloHertz (10 kHz).

20. The method of claim 17, wherein the cyclic signal is a sinusoidal signal.

21. The method of claim 17, wherein applying and sensing are performed at a row level of combined magnetic head fabrication.

22. The method of claim 21, wherein the cyclic signal is a square wave.

23. The method of claim 21, wherein the cyclic signal is a sinusoidal signal.

* * * * *